United States Patent
Dawson

(10) Patent No.: US 7,703,134 B2
(45) Date of Patent: *Apr. 20, 2010

(54) DE-AUTHENTICATION OF NETWORK COMPONENT

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1484 days.

This patent is subject to a terminal disclaimer.

(21) Appl. No.: 11/045,236

(22) Filed: Jan. 28, 2005

(65) Prior Publication Data

US 2006/0174328 A1 Aug. 3, 2006

(51) Int. Cl.
- G06F 7/04 (2006.01)
- G06F 12/00 (2006.01)
- G06F 12/14 (2006.01)
- G06F 13/00 (2006.01)
- G11C 7/00 (2006.01)

(52) U.S. Cl. .................................. 726/20; 380/240
(58) Field of Classification Search .................. 709/220, 709/225; 455/432, 433; 713/201, 168, 200, 713/169, 155; 370/338; 700/94; 726/20; 380/240

See application file for complete search history.

(56) References Cited

U.S. PATENT DOCUMENTS

| | | | |
|---|---|---|---|
| 5,544,321 A | 8/1996 | Theimer et al. | |
| 5,544,322 A | 8/1996 | Cheng et al. | |
| 5,555,376 A | 9/1996 | Theimer et al. | |
| 5,574,860 A * | 11/1996 | Perlman et al. | 709/220 |
| 5,987,153 A | 11/1999 | Chan et al. | |
| 6,044,062 A | 3/2000 | Brownrigg et al. | |
| 6,151,628 A | 11/2000 | Xu et al. | |
| 6,202,158 B1 | 3/2001 | Urano et al. | |
| 6,269,395 B1 | 7/2001 | Blatherwick et al. | |
| 6,272,129 B1 | 8/2001 | Dynarski et al. | |
| 6,275,934 B1 | 8/2001 | Novicov et al. | |
| 6,353,599 B1 | 3/2002 | Bi et al. | |
| 6,374,079 B1 | 4/2002 | Hsu | |
| 6,480,101 B1 | 11/2002 | Kelly et al. | |
| 6,608,911 B2 | 8/2003 | Lofgren et al. | |
| 7,260,719 B1 * | 8/2007 | Asano et al. | 713/169 |

(Continued)

OTHER PUBLICATIONS

Karaoguz, J.; High-rate wireless personal area networks; Publication Date: Dec. 2001; Communications Magazine, IEEE; vol. 39, Issue: 12; On pp. 96-102.*

*Primary Examiner*—Kambiz Zand
*Assistant Examiner*—Monjour Rahim
(74) *Attorney, Agent, or Firm*—Miller Patent Services; Jerry A. Miller

(57) ABSTRACT

A wireless home entertainment system consistent with certain embodiments has at least one server having at least one manipulable authentication element thereon, wherein the manipulable authentication element is not a general purpose data entry element. At least one component is in wireless communication with the server. A User Interface is used for selecting an authenticated component to be de-authenticated. A person can cause the server to regard an authenticated component as being de-authenticated by manipulating the authentication element while a component to be de-authenticated is selected using the user interface. This abstract is not to be considered limiting, since other embodiments may deviate from the features described in this abstract.

22 Claims, 3 Drawing Sheets

U.S. PATENT DOCUMENTS

| | | | |
|---|---|---|---|
| 7,324,805 B2 * | 1/2008 | Nakakita et al. | 455/411 |
| 7,356,691 B2 * | 4/2008 | Dawson | 713/155 |
| 7,385,958 B2 * | 6/2008 | Demirhan | 370/338 |
| 7,509,488 B2 * | 3/2009 | Isozaki | 713/155 |
| 2001/0031635 A1 * | 10/2001 | Bharatia | 455/432 |
| 2002/0035699 A1 | 3/2002 | Crosbie | |
| 2002/0059530 A1 | 5/2002 | Talvitie | |
| 2002/0083341 A1 | 6/2002 | Feuerstein et al. | |
| 2002/0087887 A1 * | 7/2002 | Busam et al. | 713/201 |
| 2002/0161886 A1 * | 10/2002 | Wang et al. | 709/225 |
| 2004/0054897 A1 * | 3/2004 | Dawson et al. | 713/168 |
| 2004/0098612 A1 * | 5/2004 | Lee et al. | 713/200 |
| 2006/0002349 A1 * | 1/2006 | Demirhan | 370/338 |
| 2007/0192488 A1 * | 8/2007 | DaCosta | 709/225 |
| 2008/0064396 A1 * | 3/2008 | Igoe | 455/433 |
| 2008/0065247 A1 * | 3/2008 | Igoe | 700/94 |

* cited by examiner

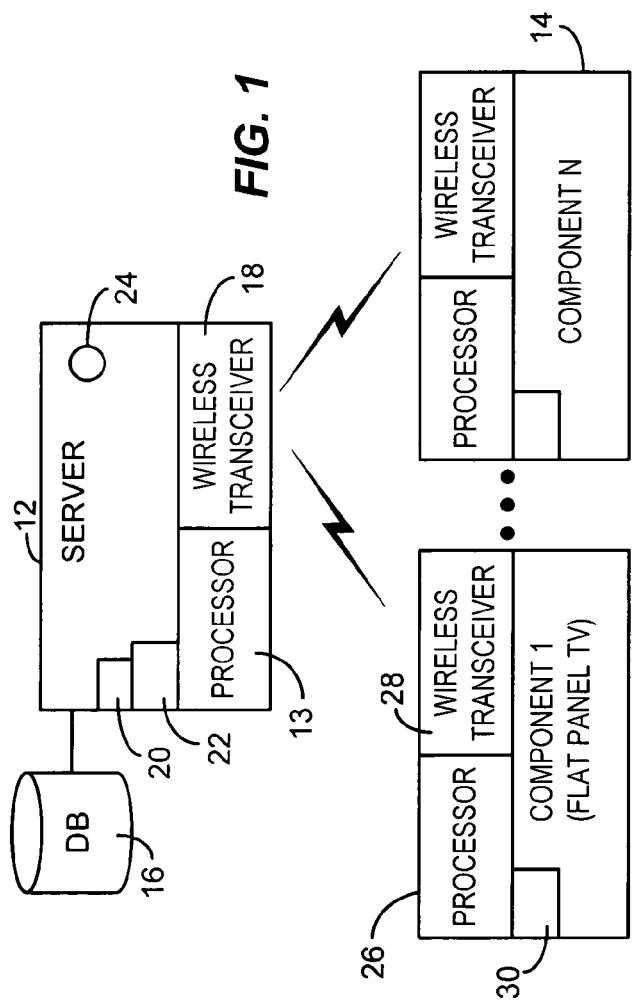
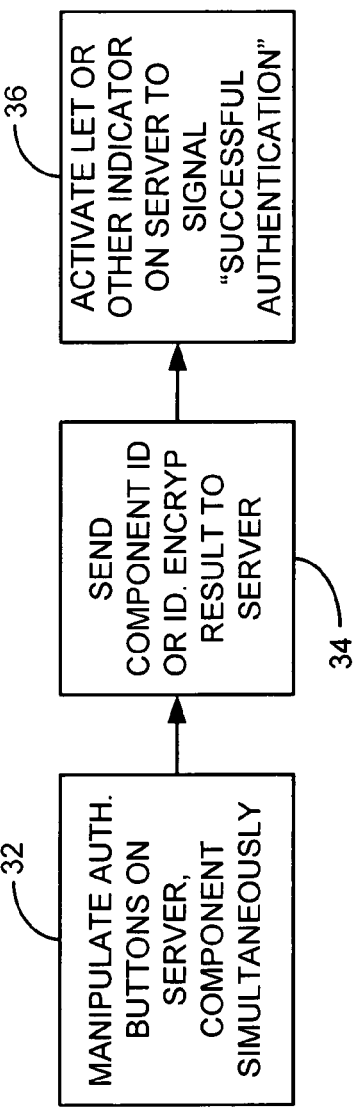

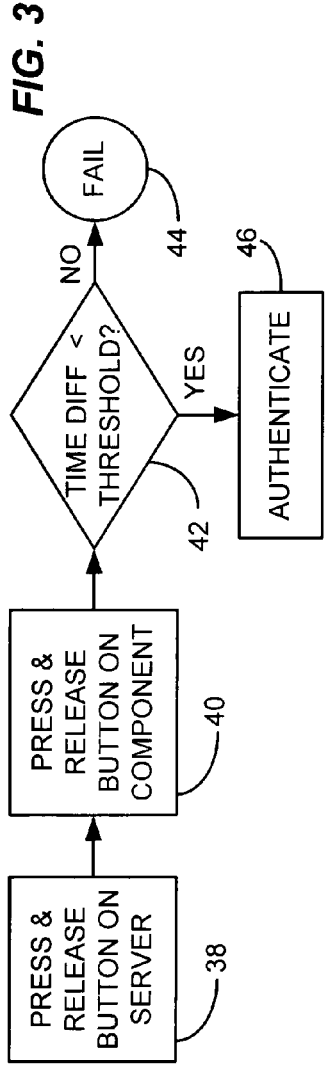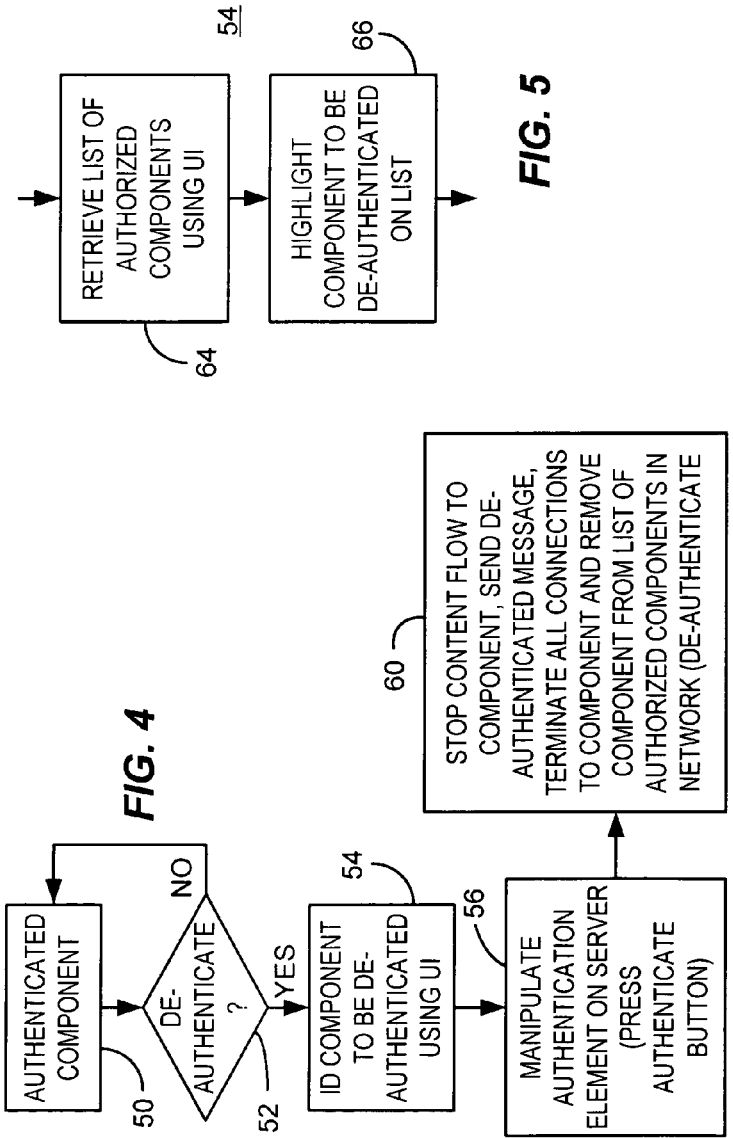

DE-AUTHENTICATION OF NETWORK COMPONENT

CROSS REFERENCE TO RELATED DOCUMENTS

This application is related to published U.S. patent application publication Ser. No. 2004/0054897 to Dawson et al., published Mar. 18, 2004 which is hereby incorporated herein by reference.

BACKGROUND

In-home wireless entertainment systems can include a central server and various components that are in wireless communication with the server and that are dispersed throughout the house. For examples, TVs, digital video disk (DVD) recorders, VCRs, Digital Video Recorders, telephones, personal digital assistants (PDAs), appliances, and so on may all be linked in a wireless entertainment system.

In a wired system, authentication and de-authentication is not generally a problem, since a component must be physically present in the home to communicate with the system. In a wireless system, however, it is possible for an eavesdropper or otherwise unauthorized person outside the home to access the system using the wireless network, which typically extends beyond the walls of the house.

Currently, wireless components are authenticated during "set up" using procedures that, for many consumers, can be confusing and complicated, and furthermore that might be less than secure. When a component is to be de-authenticated (e.g., if a device is sold or replaced or otherwise removed from the network) it is also generally advisable to de-authenticate the device from the network so that it is no longer able to communicate with the network, and thus inhibit unauthorized intrusion into the network. This process is also often confusing and complicated to the ordinary consumer.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 1 is a is a block diagram of the system architecture consistent with certain embodiments of the present invention.

FIG. 2 is a flow chart showing the authentication logic consistent with certain embodiments of the present invention.

FIG. 3 is a flow chart showing alternate authentication consistent with certain embodiments of the present invention.

FIG. 4 is a flow chart showing a de-authentication process consistent with certain embodiments of the present invention.

FIG. 5 is a flow chart showing a particular implementation of the block 54 of FIG. 4 consistent with certain embodiments of the present invention.

DETAILED DESCRIPTION

Figure 6:
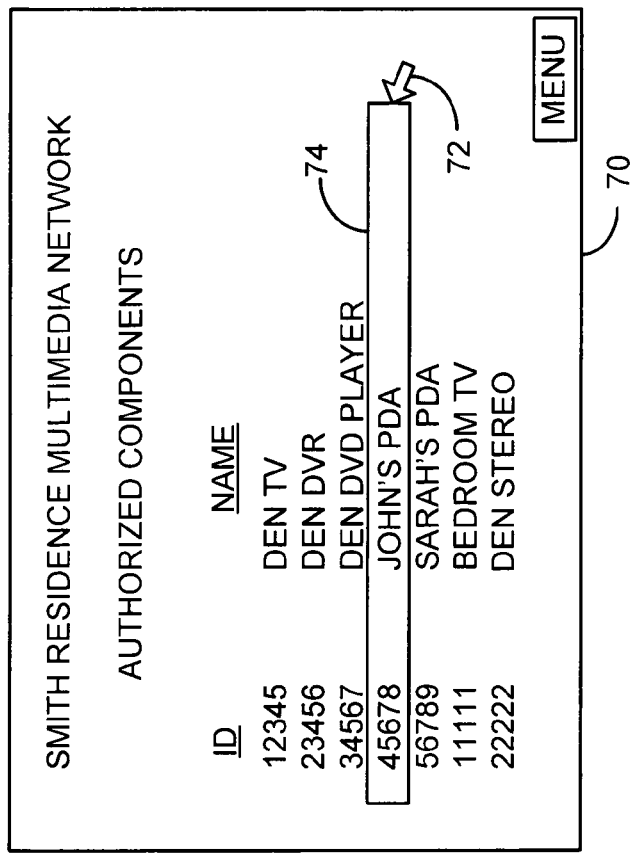
FIG. 6 is an illustration of a user interface consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Referring initially to FIG. 1, an example wireless home entertainment system is shown, generally designated 10, which includes a server 12 that can be implemented by any appropriate processor 13 and one or more components 14 that are in wireless communication with the server 12. For ease of illustration FIG. 1 shows two components 14, although more components 14 can be used. Non-limiting examples of embodiments of the components 14 are televisions, including portable flat-panel TVs, digital video disk (DVD) players, video cassette recorders (VCR), telephones, personal digital assistants (PDAs), digital video recorders (DVR) and household appliances.

In the particular embodiment shown in FIG. 1, the server 12 can access a database 16 of, e.g., audio-video content. In addition to the processor 13, the server 12 can also include a wireless transceiver 18, e.g., a code division multiple access (CDMA) transceiver. Other wireless communication principles, however, can be used, including other radiofrequency, infrared, and acoustic transmission principles.

In accordance with certain embodiments, the server 12 incorporates at least one and more preferably two human-manipulable authentication elements 20, 22. The elements 20, 22 may be implemented as buttons or toggles or switches or their functional equivalents. In any case, by "authentication element" is meant a manipulative device such as a button that does not function as a data entry device such as a keypad or keyboard, but instead is a single-purpose element that cannot be used for general data entry, but that simply activates the server to function in accordance with the logic below. In the example non-limiting embodiment shown in FIG. 1, a first authentication element 20, when manipulated, indicates that the component 14 sought to be registered for authentication is to have unlimited system access. In contrast, a second authentication element 22, when manipulated, indicates that the component 14 sought to be registered for authentication is to have limited system access, e.g., access to only predetermined content or channels.

As also shown in FIG. 1, the server 12 may include an indication 24 (visible and/or audible) that can be implemented by a light emitting diode (LED), a front panel display message, a message on a display screen associated with the server 12, etc. As discussed further below, the indication 24 is used to indicate successful registration for authentication of a component 14.

Turning to the specifics of an example non-limiting component 14, each component 14 may include a processor 26 and a wireless transceiver 28 for communicating with the server 12 and/or other components 14. The component processor 26 and server processor 13 may act alone or in concert with each other to execute the logic herein. Also, each component 14 includes at least one human-manipulable authentication element 30.

FIG. 2 shows the authentication logic of certain embodiments consistent with the present invention, as can be embodied in software or hardware. FIG. 2, as well as all other flow charts shown herein, is in logic flow format for convenience of disclosure, but part or all of the logic can be implemented by programmed processor, state machines or other logic devices.

Commencing at block 32, a user wishing to register a component 14 for authentication (also generally referred to herein as "authenticating" or "authorizing" the component) simultaneously manipulates the component authentication element 30 and one of the server authentication elements 20, 22 (depending on the level of system access to be granted the component 14). Manipulation of the server authentication element 20 causes the server to be configured to receive a message from the component 14. This message is transmitted at block 34 by the component 14 in response to manipulation of the component authentication element 30. When the server authentication element 20, 22 and component authentication element 30 are buttons, manipulation at block 32 can include depressing and holding down the buttons until the indication 30 is activated as described below.

In one non-limiting embodiment, the message from the component 14 includes a unique identification associated with the component 14. This ID can be programmed into the component 14 at time of manufacture of either the processor 26 chip or component 14 manufacture or assembly, and can be input to a write-once read many type of device, such as a fusible link ROM. Alternatively, for even greater security the message transmitted by the component 14 can be an encryption result of the ID. For instance, the ID can be used as a seed for a key generation algorithm. In this case, the key, which may not be readable from any outside component, might not be transmitted, but rather only the results of an encryption algorithm that uses the key. This can be part of an overall authentication key exchange that might be implemented in accordance with public key/private key principles known in the art.

Proceeding to block 36, if the message is successfully read and processed by the server 12, the indication 24 can be activated to so inform the user. At this point, the component 14 has been authenticated to the server 12 to afford the component 14 the level of system 10 access indicated by the server authentication element 20, 22 that was manipulated. Subsequently, the component 14 can automatically communicate with the server 12 in accordance with session wireless authentication procedures known in the art.

FIG. 3 shows that in an alternate embodiment, the server authentication element and component authentication element need not be manipulated simultaneously with each other, but rather can be manipulated within a predetermined time period of each other, e.g., a second or two. It can be seen that the first embodiment is a subset of the second, since simultaneousness is within a predetermined time period. Accordingly, at block 38 the server authentication element 20, 22 is manipulated and released. Then, at block 40 the component authentication element 30 is manipulated and released. At decision diamond 42 it is determined whether the manipulations occurred within the predetermined period and if not, "fail" is returned at state 44. Otherwise, "authenticate" is indicated at block 46. In this embodiment, clocks in the component 14/server 12 can be synchronized.

FIG. 4 is a flow chart showing an exemplary de-authentication process consistent with certain embodiments of the present invention. Consider, for example, a home multimedia network which incorporates a PDA. If a user chooses to upgrade to a newer PDA and sell or give away the old PDA, it is possible that the user will not want the new user to have access to the home multimedia network using the old PDA. In such a case, a de-authentication process is needed to remove the device from the network. As is the case with authentication, a typical consumer needs a simple mechanism to control access to the network. In this case, the same human-manipulable authentication element such as 20 or 22 (or some combination of human manipulable elements) can be utilized to simply and quickly de-authenticate a network component. In this case, an exemplary process for doing so is depicted in FIG. 4.

In this process, the normal state of operation is indicated by 50 where the component is authenticated and thus authorized to access the network until a decision is made to de-authenticate the component at 52. When an element is to be removed, it is identified at 54 using a user interface (UI) forming a part of server 12, or alternatively accessed via another device to provide human interface functions for the server 12 (e.g., a computer forming a part of the network that addresses a user interface by accessing an IP address or other address of the server).

Once the component is identified at 54, the user manipulates the authentication element (i.e., presses the authenticate button on the server) at 56. This results in removal of the component from the list of authorized users stored in memory on the server, and thus de-authenticates the component at 60. This process 60 further may further involve determining if content is being transmitted to (e.g., streamed) to the component being removed. If so, the flow of content is terminated. The server sends a message to the component being removed indicating that it is no longer authenticated in the network. All connections to the component are terminated and the component is removed from the list of authorized network components.

The server, if devoid of an elaborate user interface, may indicate a successful de-authorization by a blinking of LED 24 or some other indication, visible and or audible. When the list of authorized users is retrieved on a User Interface subsequent to this process, the removed device will not appear on the listing.

At the client (component) side, if on startup the client determines that it is not authenticated, a message can be displayed (assuming display capability) indicating that the component is not authenticated on the network. If the de-authentication occurs during use of the component (e.g., receipt of streaming content), any communication with the network will be halted and the component will display a message that the component is not authenticated (or authorized).

By requiring that a human manipulate a physical button on the server to de-authenticate, electronic security measures are enhanced using physical security measures. That is, the user must be able to have physical access to the server in order to either authenticate or de-authenticate a component of the network.

Thus, a method for de-authenticating a component in wireless communication with a server consistent with certain embodiments involves identifying the component to be de-authenticated using a user interface; and at the server, receiving a signal indicative of actuation of a dedicated authentication button on the server while the component is identified to de-authenticate the component.

FIG. 5 is a flow chart showing a particular implementation of the block 54 of FIG. 4 consistent with certain embodiments of the present invention. In this embodiment, the process of identifying the component as previously described involves retrieving a list of authorized components using the User Interface at 64. This can be accomplished, for example, via a menu system that leads to a screen for display of authorized users. The component to be removed is then highlighted or otherwise selected from the list of authorized users at 66. This can be accomplished using any suitable navigation method. It is noted, however, that once such a list is on the UI, pressing a normal keyboard delete button or taking other keyboard, mouse or pointer actions will be ineffective in de-authenticating (or authenticating) the component selected. The technique disclosed herein relies upon the person attempting to de-authenticate having physical access to the server and thus button 20. Absent this access, de-authentication is prohibited.

FIG. 6 is an illustration of a user interface consistent with certain embodiments of the present invention. Such user interface display 70 may appear on the server itself, or may be accessed via a display enabled network device, as previously described. In this example, a list is obtained by appropriate navigation of the User Interface. Once the list of authorized components is displayed, a pointer such as 72 or a highlighting feature shown as 74 is used to identify a particular component to be removed. Once the element is identified, the authentication button is pressed to de-authenticate the component and the component is removed from the list of active components. If desired, another embodiment requires a second verification press of the authentication button in response to a verification query to verify removal of the component.

Figure 7:
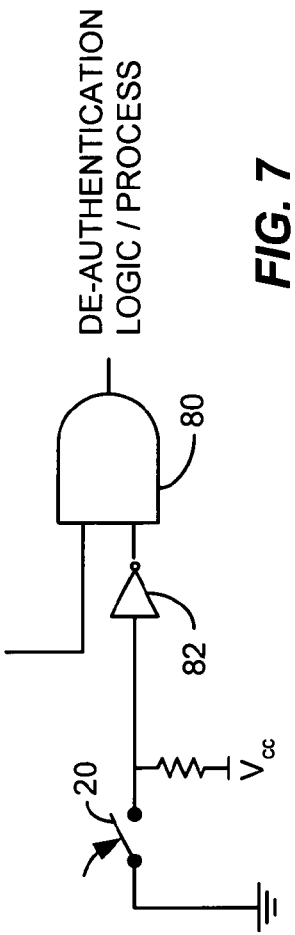
FIG. 7 is a simplified logic diagram illustrating a de-authentication arrangement consistent with certain embodiments of the present invention.

FIG. 7 is a simplified logic diagram illustrating a de-authentication arrangement consistent with certain embodiments of the present invention. This diagram is merely intended to show that the hardware button or switch 20 is a separate and distinct physical component used only in a particular authentication and de-authentication process. A logic AND process carried out by 80 is active to de-authenticate only when a selection is identified and the button 20 is pressed closing the switch. In the illustrated circuit, button 20 is grounded and thus the AND operation is carried out after inversion at inverter 82. As noted, this is intended to illustrate that the function of button 20 is that of a hard wired authentication function that is only available by use of this button, but should not literally be construed to require the circuit shown since other circuitry could also be utilized.

Thus, a wireless home entertainment system consistent with certain embodiments has at least one server having at least one manipulable authentication element thereon, wherein the manipulable authentication element is not a general purpose data entry element. At least one component is in wireless communication with the server. A User Interface is used for selecting an authenticated component to be de-authenticated. A person can cause the server to regard an authenticated component as being de-authenticated by manipulating the authentication element while a component to be de-authenticated is selected using the user interface.

A home entertainment multimedia server, consistent with certain embodiments has at least one manipulable authentication element thereon, wherein the manipulable authentication element is not a general purpose data entry element. A User Interface is provided for selecting an authenticated component to be de-authenticated. A wireless transceiver is provided for wireless communication with network components. A programmed processor controls communication with a list of authenticated components, wherein a person can cause the server to regard an authenticated component as being de-authenticated by manipulating the authentication element while a component to be de-authenticated is selected using the user interface. A person can cause the server to regard an authenticated component as being de-authenticated by manipulating the authentication element while a component to be de-authenticated is selected using the user interface.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. sctn. 112, sixth paragraph, unless the element is expressly recited using the phrase "means for" or, in the case of a method claim, the element is recited as a "step" instead of an "act".

What is claimed is:

1. A wireless home entertainment system, comprising:
   at least one server having at least one manipulable authentication element thereon, wherein the manipulable authentication element is not a general purpose data entry element;
   at least one component in wireless communication with the server;
   a User Interface for selecting an authenticated component to be de-authenticated; and
   wherein a person can cause the server to regard an authenticated component as being de-authenticated by manipulating the authentication element while a component to be de-authenticated is selected using the user interface.

2. The system of claim 1, wherein the element comprises a button.

3. The system of claim 1, wherein the de-authentication comprises removing the component from a list of authorized components.

4. The system of claim 1, wherein the dc-authenticating comprises stopping any content being delivered to the component, sending a message to the component that it is de-authenticated, and terminating all connections to the component.

5. The system of claim 1, wherein the server further comprises means for indicating that the component is de-authenticated.

6. The system of claim 5, wherein the means for indicating generates an audible or visual signal.

7. The system of claim 1, wherein the User Interface forms a part of the server.

8. A method for de-authenticating a component in wireless communication with a server, comprising:
   at the server, identifying the wireless component that is in wireless communication with the server to be de-authenticated using a user interface forming a part of the server;
   the wireless component comprising one component on a list of components in communication with the server; and
   at the server, receiving a signal indicative of actuation of a dedicated authentication button situated on and forming a cart of the server while the wireless component is identified to de-authenticate the component, where the authentication button is not a general purpose data entry button.

9. The method of claim 8, wherein the dc-authentication comprises removing the component from the list of authorized components.

10. The method of claim 8, wherein the de-authenticating comprises stopping any content being delivered to the component, sending a message to the component that it is de-authenticated, and terminating all connections to the component.

11. The method of claim 8, further comprising providing an indication that the component is de-authenticated.

12. The method of claim 11, wherein providing the indication comprises generating an audible or visual signal.

13. The method of claim 8, wherein the User Interface forms a part of the server.

14. A computer readable storage medium storing instructions which, when executed on a programmed processor, carry out a process as described in claim 8.

15. A home entertainment multimedia server, comprising:
    at least one manipulable authentication element thereon, wherein the manipulable authentication element is not a general purpose data entry element;
    a wireless transceiver for wireless communication with network components;
    means for providing a User Interface for selecting an authenticated component to be de-authenticated; and
    a programmed processor overseeing communication with components on a list of authenticated components, and wherein a person can cause the server to regard an authenticated component as being de-authenticated by manipulating the authentication element while a component to be de-authenticated is selected using the user interface.

16. The apparatus of claim 15, wherein the element comprises a button.

17. The apparatus of claim 15, wherein the dc-authentication comprises the processor removing the component from the list of authenticated components.

18. The apparatus of claim 15, wherein the dc-authenticating comprises stopping any content being delivered to the component, sending a message to the component that it is de-authenticated, and terminating all connections to the component.

19. The apparatus of claim 15, wherein the server further comprises means for indicating that the component is de-authenticated.

20. The apparatus of claim 19, wherein the means for indicating generates an audible or visual signal.

21. The apparatus of claim 15, wherein the User Interface forms a part of the server.

22. A home entertainment multimedia server, comprising:
    at least one authentication button element thereon, wherein the authentication button is not a general purpose data entry element;
    a wireless transceiver for wireless communication with network components;
    a User Interface forming part of the server for selecting an authenticated component to be de-authenticated;
    a programmed processor overseeing communication with components on a list of authenticated components, and wherein a person can cause the server to regard an authenticated component as being de-authenticated by manipulating the authentication element while a component to be de-authenticated is selected using the user interface,
    wherein the dc-authentication comprises the processor removing the component from the list of authenticated components, stopping any content being delivered to the component, sending a message to the component that it is de-authenticated, and terminating all connections to the component; and
    means, residing on the server, for providing an audible or visual indication that the component is de-authenticated.

* * * * *